United States Patent
Park

(10) Patent No.: US 12,297,925 B2
(45) Date of Patent: May 13, 2025

(54) VALVE ACTUATOR

(71) Applicants: Hyundai Motor Company, Seoul (KR); Kia Corporation, Seoul (KR)

(72) Inventor: Chul Wan Park, Yongin-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 245 days.

(21) Appl. No.: 18/189,853

(22) Filed: Mar. 24, 2023

(65) Prior Publication Data
US 2024/0110636 A1    Apr. 4, 2024

(30) Foreign Application Priority Data
Sep. 29, 2022    (KR) .................. 10-2022-0124480

(51) Int. Cl.
| F16K 49/00 | (2006.01) |
| B60L 58/33 | (2019.01) |
| F16K 31/04 | (2006.01) |
| F16K 31/53 | (2006.01) |

(52) U.S. Cl.
CPC ............ *F16K 31/043* (2013.01); *B60L 58/33* (2019.02); *F16K 31/535* (2013.01); *F16K 49/00* (2013.01)

(58) Field of Classification Search
None
See application file for complete search history.

(56) References Cited

U.S. PATENT DOCUMENTS

| 6,860,466 B2* | 3/2005 | Sakurai ................ F16K 1/221 310/91 |
| 6,892,698 B2* | 5/2005 | Kino .................... F02D 9/1035 123/403 |
| 11,047,506 B2* | 6/2021 | Baasch .................. F16K 49/00 |
| 11,808,375 B2* | 11/2023 | Uhler .................... F16K 31/043 |
| 12,065,983 B2* | 8/2024 | Kokubu ................ F16K 31/047 |
| 12,092,223 B2* | 9/2024 | Hitsuyu ............... F16K 37/0033 |
| 2012/0313025 A1* | 12/2012 | Takai .................. F16K 49/005 251/313 |
| 2015/0333603 A1* | 11/2015 | von Willich ........... H02K 9/227 310/43 |
| 2018/0003134 A1* | 1/2018 | Kobayashi ............. F16K 41/00 |

FOREIGN PATENT DOCUMENTS

JP    2012-072799    4/2012

* cited by examiner

*Primary Examiner* — Umashankar Venkatesan
(74) *Attorney, Agent, or Firm* — Fish & Richardson P.C.

(57) ABSTRACT

A valve actuator of a cooling valve is configured to control cooling water in a thermal management system for cooling a fuel cell. The valve actuator includes a motor including a rotor, a stator, and a motor housing, a gear assembly including a gear housing and being connected to a valve rotation shaft of a valve plate configured to control a passage of cooling water, a motor rotation shaft configured to rotate the rotor is connected to the gear assembly, a first underwater bearing disposed between the valve rotation shaft and the gear housing, and a second underwater bearing is disposed between the motor rotation shaft and the gear housing. Cooling water introduced into the cooling valve is introduced into the motor housing and the gear housing to cool the gear assembly and the motor.

20 Claims, 9 Drawing Sheets

VALVE ACTUATOR

CROSS-REFERENCE TO RELATED APPLICATION

This application claims, under 35 U.S.C. § 119(a), the benefit of and priority to Korean Patent Application No. 10-2022-0124480, filed on Sep. 29, 2022, the entire contents of which are incorporated herein by reference.

TECHNICAL FIELD

The present disclosure relates to a valve actuator having a structure capable of cooling a motor and gears using cooling water introduced into a cooling valve.

BACKGROUND

A fuel cell system adopted in a hydrogen fuel cell vehicle comprises a fuel cell stack configured to generate electric energy from an electrochemical reaction of a reactive gas, a hydrogen supply configured to supply hydrogen as fuel to the fuel cell stack, an air supply configured to supply air containing oxygen, which is an oxidizing agent needed in the electrochemical reaction, to the fuel cell stack, and a thermal management system (TMS) configured to discharge heat, which is a byproduct of the electrochemical reaction of the fuel cell stack, to the outside so as to optimally control the operating temperature of the fuel cell stack and perform a water management function.

In the thermal management system of the fuel cell, a cooling valve configured to control the passage of cooling water for cooling the fuel cell is adopted. The cooling valve may flow the cooling water introduced from components such as a fuel cell stack, a cathode oxygen depletion (COD) heater, an ion filter, and a radiator constituting the thermal management system into a cooling water pump. The flow passage of the cooling water may be changed according to the opening and closing control of the cooling valve. The cooling valve may include a valve portion including a valve plate having defined therein ports through which cooling water is introduced and configured to open and close the ports, and a valve actuator configured to directly rotate the valve portion.

In a valve actuator of a general cooling valve, ball bearings and gears that cannot be used in water are adopted. For this reason, in the valve actuator, an oil seal is adopted on a valve rotation shaft configured to rotate a valve plate so as to prevent entrance of cooling water.

However, because the valve actuator is a component that is always running while the hydrogen fuel cell vehicle is traveling, friction is generated between gears and a plurality of rotation shafts constituting the valve actuator, thereby increasing the temperature of the gears and resulting in wear. When the gears are continuously worn down, the durability of the gears eventually decreases. In addition, because the bearings are exposed to air, grease in the bearings is oxidized over time, resulting in a decrease in the lubrication performance of the gears.

Furthermore, when the oil seal configured to prevent cooling water from being introduced into the valve actuator is worn down, the ball bearings and gears adopted in the valve actuator may be immersed in water and corrosion may occur. Accordingly, because the cooling valve is continuously running, the possibility that the valve actuator may fail increases.

In addition, due to the limitation in size of the cooling valve, a separate cooling structure configured to cool a controller, which controls the valve actuator, is not adopted in the cooling valve. Accordingly, the controller is overheated and the performance of the cooling valve is deteriorated.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a valve actuator that has adopted gears and bearings capable of being used underwater, thereby being able to cool gears, a motor, and a controller configured to control the motor without using an oil seal configured to prevent cooling water from being introduced into the valve actuator.

In one aspect, the present disclosure provides a valve actuator of a cooling valve configured to control cooling water in a thermal management system for cooling a fuel cell, the valve actuator including a motor including a rotor, a stator, and a motor housing, a gear assembly including a gear housing, wherein the gear assembly may be connected to a valve rotation shaft of a valve plate of the cooling valve, the valve plate configured to control the passage of cooling water, and a motor rotation shaft configured to rotate the rotor may be connected to the gear assembly, a first underwater bearing may be disposed between the valve rotation shaft and the gear housing, and a second underwater bearing may be disposed between the motor rotation shaft and the gear housing, wherein cooling water introduced into the cooling valve may be introduced into the motor housing and the gear housing so as to cool the gear assembly and the motor.

In some implementations, the gear housing may define a first hole configured to receive cooling water introduced from a valve portion of the cooling valve into the gear housing, the valve portion comprising the valve plate and the valve rotation shaft.

In some implementations, the gear housing may define therein a second hole configured to receive cooling water to be introduced into the motor housing from the gear housing.

In some implementations, the motor housing may comprise a partition wall disposed between the stator and the rotor, and configured to block the cooling water in the motor housing from being introduced to the stator.

In some implementations, the valve actuator may further include a third underwater bearing disposed at the motor rotation shaft and spaced apart from the second underwater bearing in an extension direction of the motor rotation shaft.

In some implementations, the motor housing may define an insertion portion that receives the motor rotation shaft, and the third underwater bearing may be disposed between the insertion portion and the motor rotation shaft.

In some implementations, each of the first underwater bearing, the second underwater bearing, and the third underwater bearing may be made of any one of polypropylene (PP), polyphthalamide (PPA), polyamide9T (PA9T), polyphenylene sulfide (PPS), polyether ether ketone (PEEK), polyphenylsulfone (PPSU), polyetherimide (PEI), or polysulfone (PSU).

In some implementations, a controller configured to control the motor may be disposed in a space between the partition wall and the motor housing with respect to a direction in which the motor rotation shaft extends.

In some implementations, the motor housing may have an outer side, with respect to a direction in which the motor rotation shaft extends, having disposed thereon a controller configured to control the motor and a controller housing surrounding the controller.

In some implementations, the gear assembly may include a first gear portion connected to the valve rotation shaft, a second gear portion connected to the motor rotation shaft, and a third gear portion engaged with the first gear portion and the second gear portion. Here, the motor rotation shaft may define to hollow configured to receive cooling water.

In some implementations, in a direction opposite the gear housing with respect to the motor, a controller configured to control the motor may be disposed.

According to another aspect, the present disclosure provides a valve actuator of a cooling valve configured to control cooling water in a thermal management system configured to cool a fuel cell, the valve actuator including a motor including a rotor, a stator, and a motor housing, a motor rotation shaft configured to rotate the rotor, a gear assembly including a gear housing, wherein the gear housing may be disposed in a valve housing of the cooling valve, the valve housing surrounding a valve plate and a valve rotation shaft configured to control a passage of cooling water, and the gear assembly may have a first side connected to the valve rotation shaft and may have a second side connected to the motor rotation shaft, a first underwater bearing disposed between the valve rotation shaft and the gear housing, and a second underwater bearing disposed between the motor rotation shaft and the motor housing, wherein cooling water introduced into the cooling valve may be introduced into the motor housing and the gear housing so as to cool the gear assembly and the motor.

In some implementations, the gear housing may define a first hole configured to receive cooling water from the valve housing into the gear housing. Here, cooling water may be introduced from the valve housing into the gear housing through the first hole through the first hole.

In some implementations, the motor housing may be divided into a first region in which the stator is disposed and sealed, and a second region in which the rotor is disposed, the motor housing may include a partition wall separating the first region from the second region, and a motor cap engaged with the partition wall, and wherein the valve actuator further comprises a controller disposed in the first region between the partition wall and the motor housing, the partition wall surrounding an axis of the motor rotation shaft.

In some implementations, the motor rotation shaft may pass through the motor cap, and the motor cap may define a second hole configured to receive cooling water introduced from the gear housing into the second region in the motor housing.

In some implementations, the second underwater bearing may be disposed between the motor cap and the motor rotation shaft.

In some implementations, the motor housing may define a gap configured to receive cooling water, the gap being defined at an outer side of the first region in a radial direction of the motor rotation shaft. Here, the gap may be an empty space defined in the outer side of the first region in a direction perpendicular to the direction in which the motor rotation shaft extends.

In some implementations, the valve actuator may further include a third underwater bearing disposed at the motor rotation shaft and space apart from the second underwater bearing in an extension direction of the motor rotation shaft. The partition wall defines an insertion portion that receives the motor rotations shaft, Here, the third underwater bearing may be disposed between the insertion portion and the motor rotation shaft.

In some implementations, the gear assembly may include a first gear portion connected to the valve rotation shaft, a second gear portion connected to the motor rotation shaft, and a third gear portion engaged with the first gear portion and the second gear portion. Here, the gear housing may have an inner surface that defines a toothed portion engaged with the first gear portion.

In some implementations, the first gear portion may include a first carrier connected to the valve rotation shaft, and a plurality of first planetary gears connected to the first carrier, the third gear portion may include a second carrier engaged with the plurality of first planetary gears, and a plurality of second planetary gears connected to the second carrier. Here, the second gear portion may be a sun gear engaged with the plurality of second planetary gears.

Other aspects and implementations of the disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the disclosure are discussed infra.

BRIEF DESCRIPTION OF THE DRAWINGS

The above and other features of the present disclosure will now be described in detail with reference to certain exemplary implementations thereof illustrated in the accompanying drawings which are given hereinbelow by way of illustration only, and thus are not limitative of the present disclosure.

Figure 1:
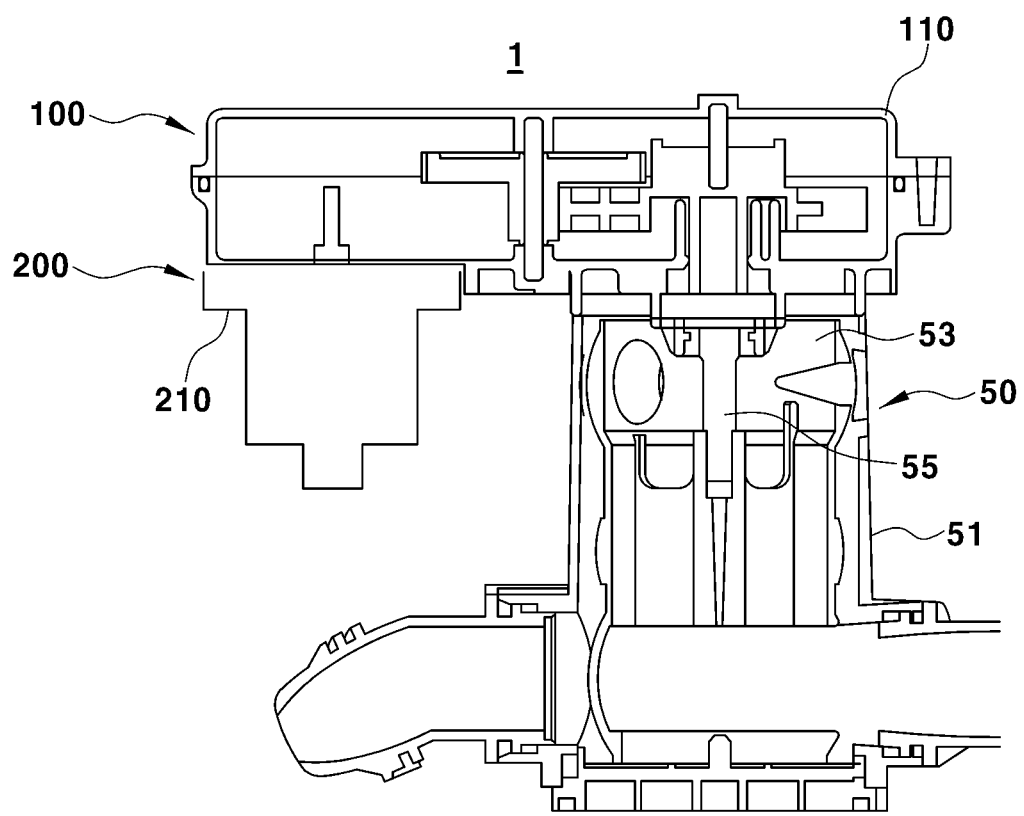
FIG. 1 is a view illustrating an example of a cooling valve.

In the figures, the reference numbers refer to the same or equivalent parts of the present disclosure throughout the several figures of the drawing.

DETAILED DESCRIPTION

Hereinafter reference will now be made in detail to various implementations of the present disclosure, examples of which are illustrated in the accompanying drawings and described below.

FIG. 1 is a view illustrating an example of a cooling valve.

Referring to FIG. 1, in some implementations, a cooling valve 1 may include a valve portion 50, a gear assembly 100, and a motor 200. The gear assembly 100 and the motor 200 are components configured to directly control the valve portion 50, and may be defined as a valve actuator. The cooling valve 1 is a component adopted in a fuel cell thermal management system configured to cool the fuel cell, and may control the flow rate and passage of cooling water.

The valve portion 50 may include a valve plate 53 configured to control the passage of cooling water, a valve rotation shaft 55 connected to the valve plate 53 and to which rotational force transmitted from the motor 200 and the gear assembly 100 is applied, and a valve housing 51 surrounding the valve plate 53 and the valve rotation shaft 55. The valve plate 53 may rotate integrally with the valve rotation shaft 55. The valve housing 51 may include input and output ports configured to introduce cooling water into the cooling valve 1 and discharge the cooling water to the components constituting the fuel cell thermal management system.

The gear assembly 100 may include at least one or more gear portions connected to the valve rotation shaft 55, and a gear housing 110 surrounding the gear portions. The gear assembly 100 may be disposed at the upper portion of the valve portion 50 with respect to a direction in which the cooling valve 1 is disposed as illustrated in FIG. 1, but may also be disposed at the lower portion of the valve portion 50 with respect to the direction in which the cooling valve 1 is disposed. For example, the gear assembly 100 may include at least one spur gear.

The motor 200 may apply rotational force to the gear assembly 100. The motor 200 may include a rotor, a stator, and a motor rotation shaft which constitute the motor 200, and a motor housing 210 surrounding the rotor, the stator, and the motor rotation shaft. The motor housing 210 may protrude downwards with respect to the direction in which the cooling valve 1 is disposed in the gear housing 110.

The passage of the cooling water introduced into the cooling valve 1 or the valve portion 50 may be changed by rotation of the valve plate 53. The cooling water may be introduced into the gear housing 110 from the valve portion 50, and the cooling water introduced into the gear housing 110 may be introduced into the motor housing 210. Therefore, the components constituting the gear assembly 100 and the motor 200 may be cooled by the cooling water. Moreover, because cooling water is always present in the cooling valve 1 while the fuel cell thermal management system is running, problems such as increase in wear and lack of lubrication due to friction between gear portions constituting the gear assembly 100 may be solved. Because bearings in the cooling valve 1 according to the implementation of the present disclosure are in contact with cooling water, underwater bearings may be adopted in the cooling valve 1. An underwater bearing may be a bearing capable of being used in water.

Figure 2:
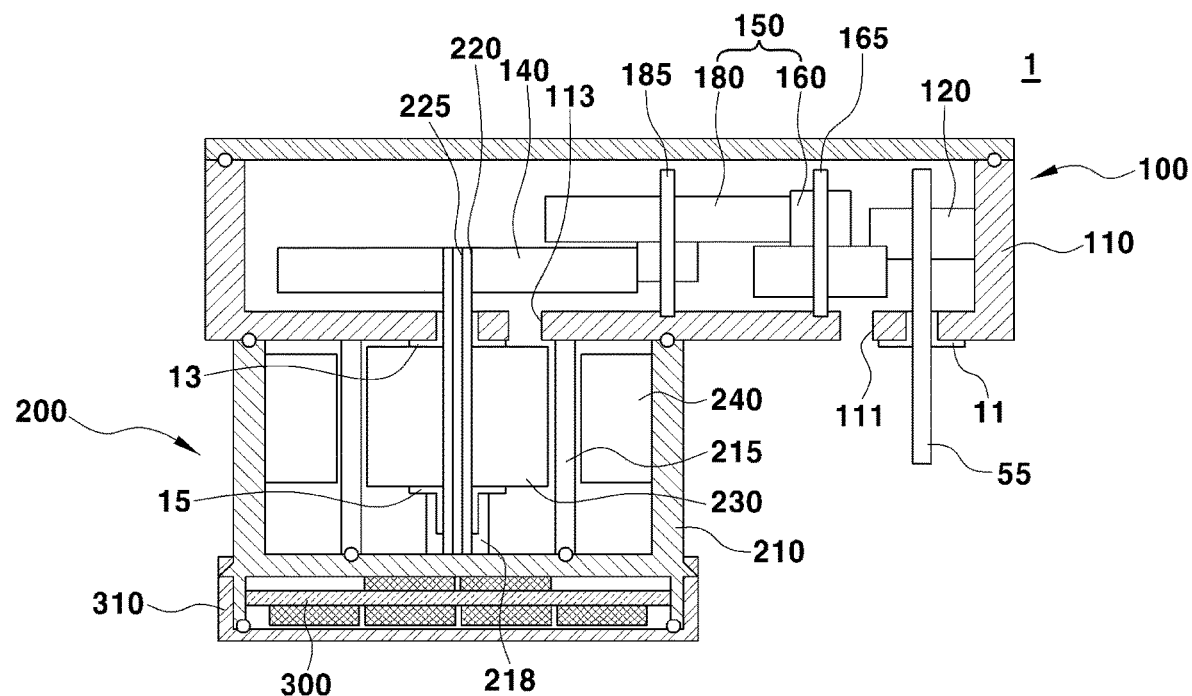
FIG. 2 is a schematic view illustrating an example of a valve actuator including a spur gear.

FIG. 2 is a schematic view illustrating an example of a valve actuator including a spur gear.

Referring to FIGS. 1 and 2, the gear assembly 100 may be connected to the valve rotation shaft 55 of the valve plate 53 configured to control the passage of cooling water. The gear assembly 100 may include a first gear portion 120, a second gear portion 140, a third gear portion 150, and the gear housing 110. For example, the first gear portion 120, the second gear portion 140, and the third gear portion 150 may be spur gears that are capable of being used in water. For example, the first gear portion 120, the second gear portion 140, and the third gear portion 150 may be underwater gears. The first gear portion 120, the second gear portion 140, and the third gear portion 150 may be disposed inside the gear housing 110. The first gear portion 120, the second gear portion 140, and the third gear portion 150 may each include at least one gear.

The first gear portion 120 may be connected to the valve rotation shaft 55. The second gear portion 140 may be connected to a motor rotation shaft 220 which is a component of the motor 200. The third gear portion 150 may be engaged with the first gear portion 120 and the second gear portion 140. As an example, the third gear portion 150 may include a first sub-gear portion 160 engaged with the first gear portion 120 and a second sub-gear portion 180 engaged with the second gear portion 140. The first sub-gear portion 160 may rotate about a first rotation shaft 165, and the second sub-gear portion 180 may rotate about a second rotation shaft 185. When the motor rotation shaft 220 is rotated by the operation of the motor 200, the second gear portion 140 may be rotated, and by the rotation of the second gear portion 140, the second sub-gear portion 180, the first sub-gear portion 160, and the first gear portion 120 may be rotated. When the first gear portion 120 is rotated, the valve rotation shaft 55 may be rotated to control the flow passage of cooling water.

Cooling water may be introduced into the gear assembly 100 from the valve portion 50. The cooling water may be introduced into the gear housing 110 through a space between the valve rotation shaft 55 passing through the gear housing 110 and the gear housing 110, a space between a first underwater bearing 11 disposed on the valve rotation shaft 55 and the gear housing 110, and a space between the first underwater bearing 11 and the valve rotation shaft 55. The first underwater bearing 11 may be disposed in a space between the valve rotation shaft 55 and the gear housing 110.

The gear housing 110 may have defined therein a first hole 111 through which cooling water is introduced into the gear housing 110 from the valve portion 50. Through the first hole 111, cooling water may be smoothly introduced into the gear housing 110 from the valve portion 50.

The motor 200 may include the motor rotation shaft 220, a rotor 230, and a stator 240. For example, the motor 200 may be a brushless motor (e.g., brushless DC electric motor (BLDC)). The motor rotation shaft 220 may pass through the gear housing 110 so as to be connected to the second gear portion 140. The rotor 230 may be connected to the motor rotation shaft 220 and rotate integrally with the motor rotation shaft 220. The motor rotation shaft 220 has defined therein a hollow 225 into which cooling water is introduced. When cooling water is introduced into the hollow 225, the motor rotation shaft 220 and the inner side of the rotor 230 in contact with the motor rotation shaft 220 may be cooled.

The rotor 230 and the stator 240 may be spatially separated by a partition wall 215. The rotor 230 and the stator 240 may be disposed to be spaced apart from each other, and the partition wall 215 may be disposed between the rotor 230 and the stator 240. The partition wall 215 may be manufactured in various shapes, but may have a structure that spatially separates the rotor 230 from the stator 240 and prevents cooling water from being introduced into the stator 240. As an example, the partition wall 215 may extend downwards from the gear housing 110. In other words, the partition wall 215 may extend in a direction in which the motor rotation shaft 220 extends, and because the partition wall 215 and the motor housing 210 are brought into contact with each other, a space where the stator 240 is disposed may be sealed. Therefore, the cooling water introduced into the motor housing 210 may not be introduced into the space where the stator 240 is disposed.

The motor rotation shaft 220 may have disposed thereon a second underwater bearing 13. The second underwater bearing 13 may be disposed between the motor rotation shaft 220 and the gear housing 110. Cooling water may be introduced into the motor housing 210 from the gear housing 110 through a space between the motor rotation shaft 220 and the second underwater bearing 13, and through a space between the second underwater bearing 13 and the gear housing 110.

The gear housing 110 may have defined therein a second hole 113 through which cooling water is introduced into the motor housing 210 from the gear housing 110. Through the second hole 113, cooling water may be smoothly introduced into the motor housing 210 from the gear housing 110. The cooling water introduced through the second hole 113 may flow towards the rotor 230.

The motor housing 210 may have one side at which an insertion portion 218, into which the motor rotation shaft 220 is inserted, is located. The one side of the motor housing 210 may refer to a portion in which the motor rotation shaft 220 extending from the second gear portion 140 is brought into contact with the motor housing 210. The insertion portion 218 may protrude from the one side of the motor housing 210 in the direction in which the motor rotation shaft 220 extends, and may define therein a space into which the motor rotation shaft 220 is inserted. The motor rotation shaft 220 may have disposed thereon a third underwater bearing 15. The third underwater bearing 15 may be disposed in a space between the motor rotation shaft 220 and the insertion portion 218. In other words, the third underwater bearing 15 may be inserted into an empty space defined in the insertion portion 218. The third underwater bearing 15 may be disposed at a position opposite the second underwater bearing 13 with respect to the direction in which the motor rotation shaft 220 extends. In other words, the rotor 230 may be disposed between the second underwater bearing 13 and the third underwater bearing 15, and the second underwater bearing 13 and the third underwater bearing 15 may each be disposed at a corresponding one of opposite ends of the motor rotation shaft 220.

The first gear portion 120, the second gear portion 140, the third gear portion 150, the first underwater bearing 11, the second underwater bearing 13, and the third underwater bearing 15 may be made of a material that is not corroded by cooling water. The first gear portion 120, the second gear portion 140, the third gear portion 150, the first underwater bearing 11, the second underwater bearing 13, and the third underwater bearing 15 may be made of a material having a low water absorption rate, having no change in strength even after absorbing water, and having high wear resistance. For example, each of the first gear portion 120, the second gear portion 140, the third gear portion 150, the first underwater bearing 11, the second underwater bearing 13, and the third underwater bearing 15 may be made of a plastic material, specifically, any one of polypropylene (PP), polyphthalamide (PPA), polyamide9T (PA9T), polyphenylene sulfide (PPS), polyether ether ketone (PEEK), polyphenylsulfone (PPSU), polyetherimide (PEI), or polysulfone (PSU).

On the outer side of the motor housing 210 with respect to the direction in which the motor rotation shaft 220 extends, a controller 300 configured to control the motor 200 may be disposed. The controller 300 may be disposed in a direction opposite the gear housing 110 with respect to the motor 200. The controller 300 may be surrounded by a controller housing 310. In other words, the controller 300 may be disposed in a space defined by the controller housing 310 and the motor housing 210 being connected to each other. Therefore, the cooling water introduced into the motor housing 210 may not be introduced into the space in which the controller 300 is disposed. Because the controller 300 is a component that generates a lot of heat, a structure configured to cool the controller 300 should be adopted. Heat generated by the controller 300 may be dissipated upwards with respect to the direction in which the cooling valve 1 is disposed, and cooling water for cooling the rotor 230 may flow towards the upper portion of the controller 300. In other words, although the controller 300 does not directly come into contact with cooling water, the heat generated by the controller 300 may be dissipated by the cooling water in contact with one side of the motor housing 210 adjacent to the controller 300.

According to the implementation of the present disclosure, because the gear portions 120, 140, and 150 capable of being used underwater and the underwater bearings 11, 13, and 15 are adopted in the cooling valve 1, cooling of the gear portions 120, 140, and 150, and the motor 200 may be facilitated, and damage due to friction among the gear portions 120, 140, and 150 may be prevented. In addition, because the gear portions 120, 140, and 150 and the underwater bearings 11, 13, and 15 are adopted in the cooling valve 1, the gear portions 120, 140, and 150 and the underwater bearings 11, 13, and 15 may be lubricated at all times without separate lubricating oil.

According to the implementation of the present disclosure, because the gear portions 120, 140, and 150 capable of being used underwater and the underwater bearings 11, 13, and 15 are adopted in the cooling valve 1, the rotor 230 of the motor 200 may be directly cooled by cooling water, and the heat generated by the controller 300 located adjacent to the rotor 230 may be easily dissipated. Accordingly, the performance of cooling the motor 200 is improved so that the high-power motor 200 may be adopted in the cooling valve 1, and because a cooling structure for cooling the controller 300 may be removed, spatial inefficiency may be eliminated.

Figure 3:
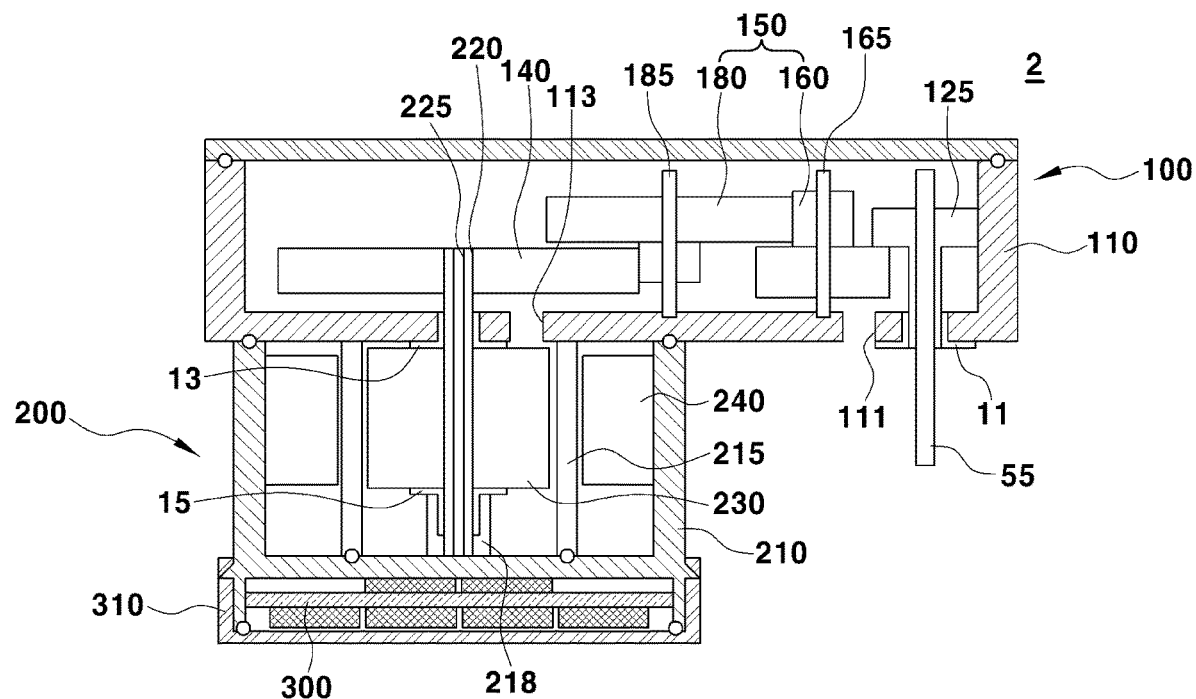
FIG. 3 is a schematic view illustrating an example of a valve actuator including a spur gear.

FIG. 3 is a schematic view illustrating an example of a valve actuator including a spur gear. For brevity, descriptions of contents overlapping those of FIG. 2 will be omitted.

Referring to FIG. 3, a cooling valve 2 may include a gear assembly 100 composed of spur gears and a motor 200. The gear assembly 100 may include a first gear portion 125, a second gear portion 140, and a third gear portion 150. The first gear portion 125 may be connected to a valve rotation shaft 55, and the first gear portion 125 may have a portion inserted into a hole defined in a gear housing 110. The first gear portion 125, inserted into the hole defined in the gear housing 110, may have disposed thereon a first underwater bearing 11. Because the first underwater bearing 11 has a structure configured to prevent friction between a component penetrating the gear housing 110 and the gear housing 110, when the component penetrating the gear housing 110 is a portion of the first gear portion 125, the first underwater bearing 11 may be disposed on the gear housing 110.

Figure 4:
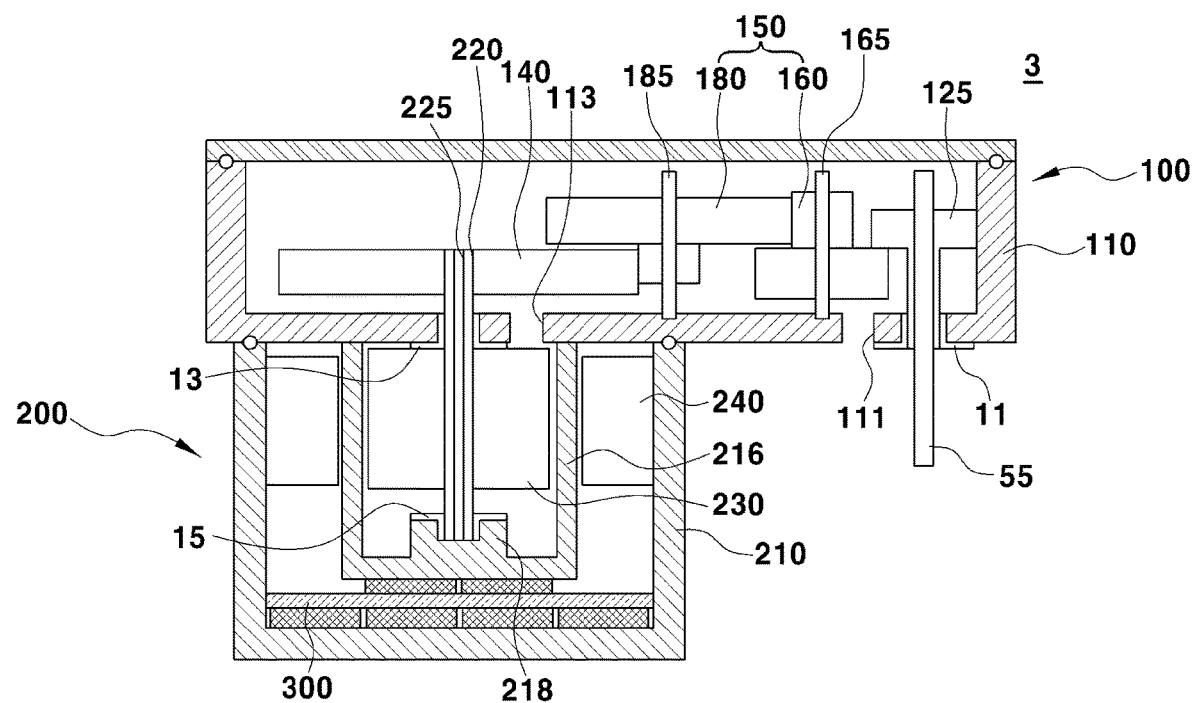
FIG. 4 is a schematic view illustrating an example of a valve actuator including a spur gear.

FIG. 4 is a schematic view illustrating an example of a valve actuator in which a spur gear is adopted. For brevity, descriptions of contents overlapping those of FIG. 2 will be omitted.

Referring to FIG. 4, in some implementations, a partition wall 216 may be disposed between a rotor 230 and a stator 240. The partition wall 216 may be connected to a gear housing 110 or to a motor housing 210. The stator 240 and a controller 300 may be disposed in a space between the partition wall 216 and the motor housing 210. The controller 300 configured to control a motor 200 may be disposed in a space between the partition wall 216 and the motor housing 210 with respect to a direction in which a motor rotation shaft 220 extends. The partition wall 216 may be disposed to surround the rotor 230 by being brought into contact with the gear housing 110. In other words, the rotor 230 and the motor rotation shaft 220 may be disposed in a space defined by the partition wall 216, and the rotor 230 and the motor rotation shaft 220 may be blocked by the partition wall 216 in the direction in which the motor rotation shaft 220 extends.

The partition wall 216 may have one side at which an insertion portion 218, into which the motor rotation shaft 220 is inserted, is located. The one side of the partition wall 216 may be a portion in which the motor rotation shaft 220 extending from a second gear portion 140 is brought into contact with the partition wall 216. The insertion portion 218 may protrude from the one side of the partition wall 216 in the direction in which the motor rotation shaft 220 extends, and may define therein a space into which the motor rotation shaft 220 is inserted. A third underwater bearing 15 may be disposed on the motor rotation shaft. The third underwater bearing 15 may be disposed in a space between the motor rotation shaft 220 and the insertion portion 218. The third underwater bearing 15 may be disposed at the motor rotation shaft 220 and space apart from a second underwater bearing 13 in an extension direction of the motor rotation shaft 220. In other words, the rotor 230 may be disposed between the second underwater bearing 13 and the third underwater bearing 15, and the second underwater bearing 13 and the third underwater bearing 15 may each be disposed at a corresponding one of opposite ends of the motor rotation shaft 220.

Although cooling water is introduced into the motor housing 210, the cooling water may not flow towards the stator 240 and the controller 300 due to the partition wall 216. In addition, the inner wall of the motor housing 210 may not come into direct contact with the cooling water, and the cooling water may only be introduced into a space defined by the partition wall 216 and the gear housing 110. Accordingly, the cooling water may cool the rotor 230.

The controller 300 may be disposed at a lowermost portion of the motor housing 210. Heat generated by the controller 300 may be transferred to an upper portion of the motor housing 210, and the partition wall 216 into which the cooling water is introduced may be positioned above the controller 300. Accordingly, the heat generated by the controller 300 may be dissipated by the cooling water introduced into the space defined by the partition wall 216.

Cooling water introduced into a cooling valve 3 may be introduced into the motor housing 210, but may only flow within the space defined by the partition wall 216. Therefore, the stator 240 and the controller 300 disposed in a space between the motor housing 210 and the partition wall 216 may not come into contact with the cooling water.

Unlike the above-described example, the partition wall 216 may be manufactured in various shapes. Here, the partition wall 216 may serve to prevent cooling water from being introduced into the space where the stator 240 is disposed while spatially separating the rotor 230 from the stator 240. In addition, the gear assembly 100 is described as a structure including a first gear portion 125, the second gear portion 140, and a third gear portion 150, but the number and shape of the gear portion may be designed in various ways to transmit power generated from the motor 200 to a valve portion 50.

Figure 5:
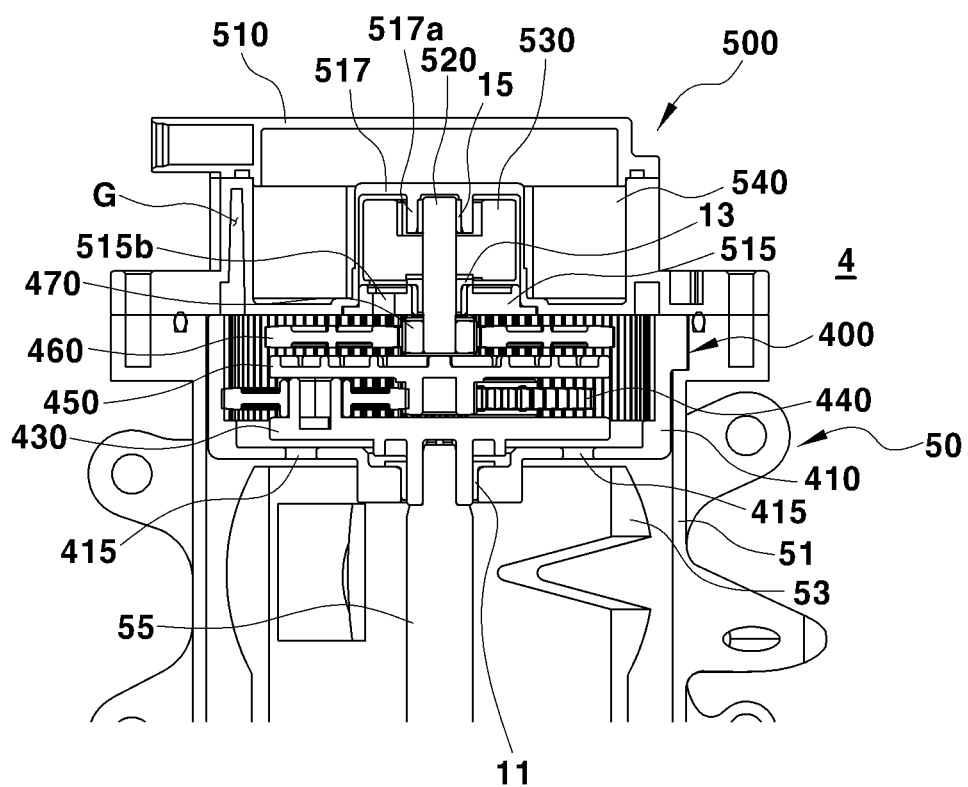
FIG. 5 is a schematic view illustrating an example of a valve actuator including a planetary gear.
Figure 6:
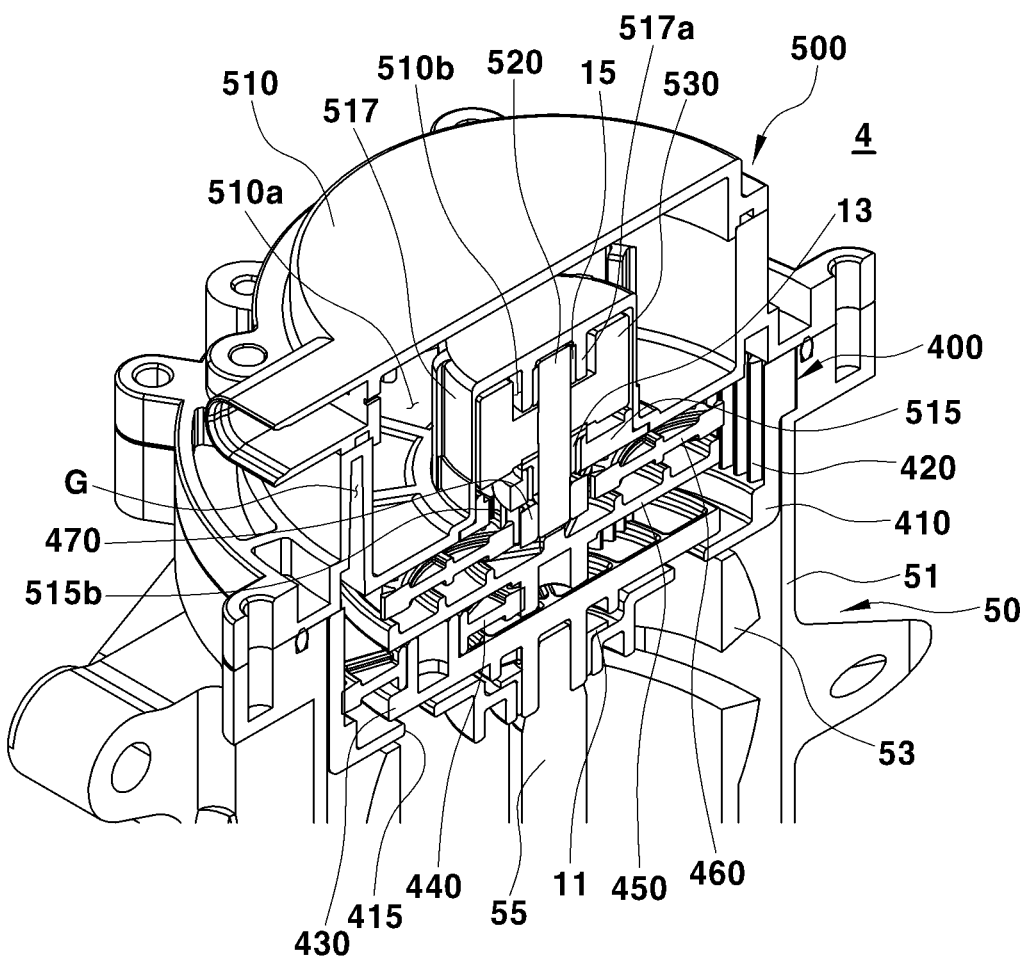
FIG. 6 is a cutaway perspective view illustrating an example of a valve actuator including a planetary gear.

FIG. 5 is a schematic view illustrating an example of a valve actuator including a planetary gear, and FIG. 6 is a cutaway perspective view illustrating an example of a valve actuator including a planetary gear.

Referring to FIGS. 5 and 6, a cooling valve 4 may include a valve portion 50, a gear assembly 400, and a motor 500. The gear assembly 400 and the motor 500 are components that directly control the valve portion 50, and may be defined as a valve actuator. The valve portion 50, the gear assembly 400, and the motor 500 may be disposed in a direction in which a valve rotation shaft 55 extends. The gear assembly 400 may be disposed above the valve portion 50, and the motor 500 may be disposed above the gear assembly 400.

The valve portion 50 may include a valve plate 53 configured to control the passage of cooling water, the valve rotation shaft 55 connected to the valve plate 53 and to which the rotational force transmitted from the motor 500 and the gear assembly 400 is applied, and a valve housing 51 surrounding the valve plate 53 and the valve rotation shaft 55. For example, the valve portion 50 may be a ball valve. The valve plate 53 may rotate integrally with the valve rotation shaft 55. The valve housing 51 may include input and output ports configured to introduce cooling water into the cooling valve and discharge the cooling water to components constituting a fuel cell thermal management system.

The gear assembly 400 may include planetary gears capable of being used in water. The gear assembly 400 may have one side connected to the valve rotation shaft 55, and may have another side connected to a motor rotation shaft 520 configured to rotate a rotor 530 of the motor.

The gear assembly 400 may include a gear housing 410, a first gear portion 430 and 440, a second gear portion 470, and a third gear portion 450 and 460. The first gear portion 430 and 440, the second gear portion 470, and the third gear portion 450 and 460 may be disposed in a space defined by the gear housing 410. The first gear portion 430 and 440 may be connected to the valve rotation shaft 55. The second gear portion 470 may be connected to the motor rotation shaft 520. The third gear portion 450 and 460 may be engaged with the first gear portion 430 and 440 and the second gear portion 470. For example, the first gear portion 430 and 440, the second gear portion 470, and the third gear portion 450 and 460 may be underwater gears capable of being used in water.

The gear housing 410 may have a hollow cylindrical shape. The gear housing 410 may have an inner surface provided with a toothed portion 420. For example, the gear housing 410 and the toothed portion 420 may be a ring gear. The toothed portion 420 may be engaged with the first gear portion 430 and 440.

The first gear portion 430 and 440 may include a first carrier 430 connected to the valve rotation shaft 55, and a plurality of first planetary gears 440 connected to the first carrier 430. Specifically, the first carrier 430 may be connected to the valve rotation shaft 55, and the first planetary gears 440 may be engaged with the toothed portion 420. For example, the first planetary gears 440 may be provided in three, and the first planetary gears 440 may be rotated to be engaged with one another with respect to axes protruding from the first carrier 430, respectively.

The third gear portion 450 and 460 may include a second carrier 450 engaged with the first planetary gears 440 and a plurality of second planetary gears 460 connected to the second carrier 450. The third gear portion 450 and 460 may be disposed above the first gear portion 430 and 440. For example, the second planetary gears 460 may be provided in three, and the second planetary gears 460 may be rotated to be engaged with one another with respect to axes protruding from the second carrier 450, respectively. The second carrier 450 may be rotated by being engaged with the three first planetary gears 440.

The second gear portion 470 may be engaged with the second planetary gears 460. The second gear portion 470 may be disposed in the middle of the three second planetary gears 460. For example, the second gear portion 470 may be a sun gear.

The valve rotation shaft 55 may be inserted through a hole defined in the gear housing 410, and a first underwater bearing 11 may be disposed between the valve rotation shaft 55 and the gear housing 410. In addition, the first underwater bearing 11 may be disposed between the first carrier 430 and the gear housing 410. In other words, the first carrier 430 may have a portion inserted into the hole defined in the gear housing 410, the valve rotation shaft 55 may be inserted into the first carrier 430, and the first underwater bearing 11 may be disposed on the portion of the first carrier 430 inserted into the hole defined in the gear housing 410. Cooling water may be introduced into the gear housing 410 from the valve portion 50 through a space between the first underwater bearing 11 and the first carrier 430 and a space between the gear housing 410 and the first underwater bearing 11.

The gear housing 410 may have defined therein a first hole 415 through which cooling water is introduced into the gear housing 410 from the valve portion 50. Through the first hole 415, cooling water may be smoothly introduced into the gear housing 410 from the valve portion 50.

The motor 500 may apply rotational force to the gear assembly 100. The motor 500 may include the motor rotation shaft 520, the rotor 530, a stator 540, and a motor housing 510. The motor housing 510 may surround the rotor 530 and the stator 540. The motor housing 510 may be divided into a first region 510a in which the stator 540 is disposed and sealed, and a second region 510b in which the rotor 530 is disposed. The motor housing 510 may include a partition wall 517 separating the first region 510a from the second region 510b, and a motor cap 515 engaged with the partition wall 517. In other words, the motor cap 515 may be engaged with the motor housing 510. By the partition wall 517 and the motor housing 510, the space in which the stator 540 is disposed may be sealed. The partition wall 517 may be configured to block the cooling water introduced in the motor housing 510 from being introduced to a space the stator 540. The motor rotation shaft 520 may pass through the motor cap 515. The motor cap 515 may have defined therein a second hole 515b configured to introduce cooling water from the gear housing 410 into the second region 510b of the motor housing 510. Cooling water may be introduced from the gear housing 410 into the motor housing 510 through the second hole 515b, and the cooling water may cool the rotor 530. However, because the space where the stator 540 is disposed is sealed, the cooling water may not be introduced into the space where the stator 540 is disposed.

The motor housing 510 may have defined therein a gap G, into which cooling water is introduced, at the outer side of the first region 510a. The gap G may be an empty space defined in the outer side of the first region 510a in a direction perpendicular to the direction in which the motor rotation shaft 520 extends. Cooling water introduced into the gap G may indirectly cool the stator 540 disposed in the first region 510a.

In the first region 510a between the partition wall 517 and the motor housing 510 with respect to the direction in which the motor rotation shaft 520 extends, a controller configured to control the motor 500 may be disposed. The controller may be disposed at an uppermost portion of the motor housing 510, and may be disposed above the rotor 530 and the stator 540. The controller is not directly cooled by cooling water due to being disposed in the first region 510a. However, the heat generated by the controller may be dissipated by the cooling water introduced into the second region 510b.

The motor rotation shaft 520 and the motor housing 510 may have a second underwater bearing 13 disposed therebetween. Specifically, the second underwater bearing 13 may be disposed between the motor cap 515 of the motor housing 510 and the motor rotation shaft 520. A third underwater bearing 15 may be disposed at a position opposite the second underwater bearing 13 with respect to the direction in which the motor rotation shaft 220 extends. The third underwater bearing 15 may be disposed between an insertion portion 517a defined in the partition wall 517 and the motor rotation shaft 520. The insertion portion 517a is defined in one side of the partition wall 517. The one side of the partition wall 517 may be an uppermost portion of the partition wall 517 with respect to a direction in which the cooling valve 4 is disposed. In other words, the third underwater bearing 15 may be disposed on the motor rotation shaft 520, and may be inserted into the insertion portion 517a.

The gear assembly 400, the first underwater bearing 11, the second underwater bearing 13, and the third underwater bearing 15 may be made of a material that is not corroded by cooling water. The gear assembly 400, the first underwater bearing 11, the second underwater bearing 13, and the third underwater bearing 15 may be made of a material having a low water absorption rate, having no change in strength even after absorbing water, and having high wear resistance. For example, the gear assembly 400, the first underwater bearing 11, the second underwater bearing 13, and the third underwater bearing 15 may each be made of a plastic material, specifically, any one of polypropylene (PP), polyphthalamide (PPA), polyamide9T (PA9T), polyphenylene sulfide (PPS), polyether ether ketone (PEEK), polyphenylsulfone (PPSU), polyetherimide (PEI), and polysulfone (PSU).

According to the implementation of the present disclosure, the gear assembly 400 including underwater planetary gears and the motor 500 may be cooled by the cooling water introduced into the cooling valve 4. The cooling water introduced into the valve portion 50 may be introduced into the gear housing 410 so as to cool the gear assembly 400, and may be introduced into the motor housing 510 so as to directly or indirectly cool the rotor 530, the stator 540, and the controller.

Figure 7A:
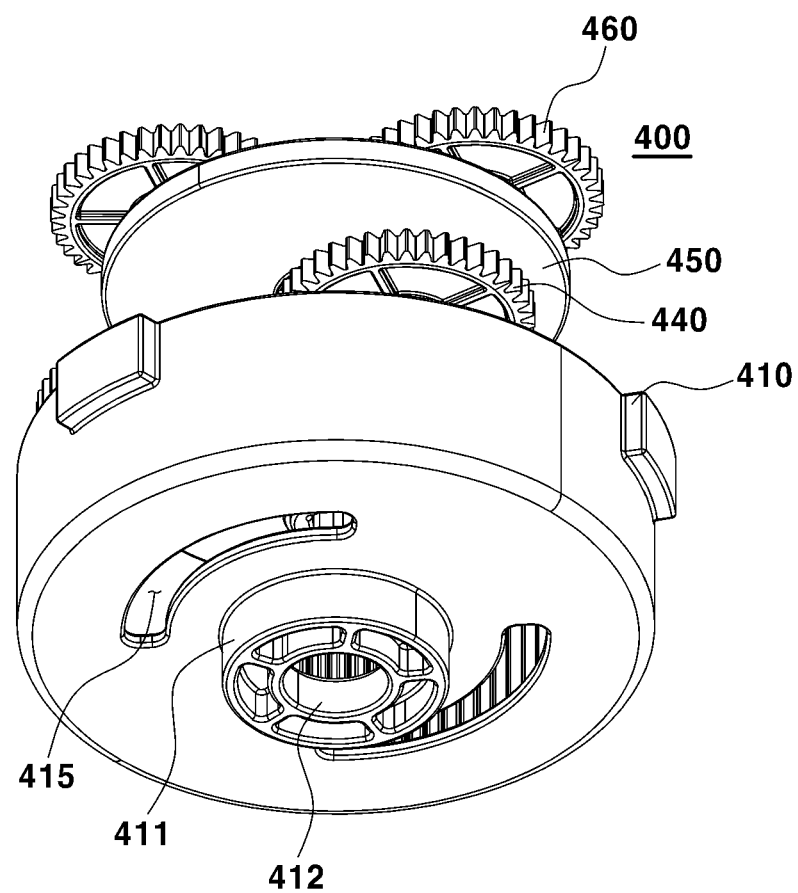
FIGS. 7A and 7B are exploded perspective views illustrating an example of a gear assembly.
Figure 7B:
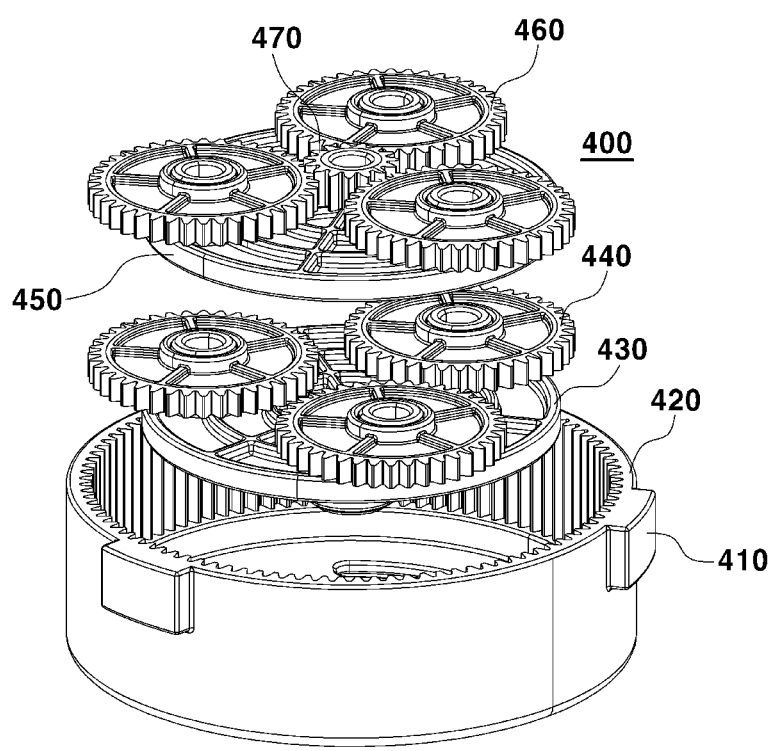

FIGS. 7A and 7B are exploded perspective views illustrating an example of a gear assembly. For brevity, description of overlapping content is omitted.

Referring to FIGS. 6, 7A, and 7B, a first carrier 430, first planetary gears 440, a second carrier 450, second planetary gears 460, and a second gear portion 470 may be disposed in a gear housing 410 which is a ring gear. The first planetary gears 440 may be disposed on the first carrier 430, the second carrier 450 may be disposed on the first planetary gears 440, and the second planetary gears 460 and the second gear portion 470 may be disposed on the second carrier 450.

The gear housing 410 may have a bottom surface having defined thereon a protrusion 411 protruding towards a valve portion 50. The protrusion 411 has a hollow cylindrical shape. The protrusion 411 may have defined therein a first through hole 412 through which the valve rotation shaft 55 passes. The first carrier 430 may have a portion inserted into the first through hole 412, and a first underwater bearing 11 may be disposed on the portion of the first carrier 430. The bottom surface of the gear housing 410 may have defined therein a first hole 415 configured to smoothly flow cooling water from the valve portion 50 into the gear housing 410.

Figure 8:
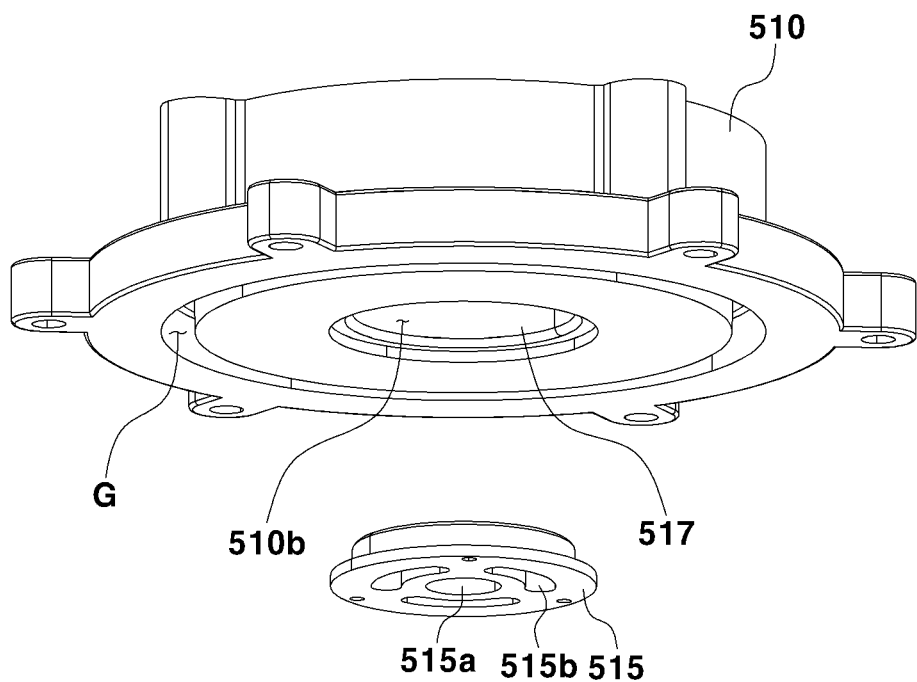
FIG. 8 is a view illustrating an example of a motor housing of a valve actuator including a planetary gear.

FIG. 8 is a view illustrating an example of a motor housing of a valve actuator including a planetary gear.

Referring to FIGS. 6 and 8, a motor housing 510 may be divided into a first region 510a in which a stator 540 is disposed, and a second region 510b in which a rotor 530 is disposed. The first region 510a and the second region 510b may be divided by a partition wall 517. The partition wall 517 or the motor housing 510 may have a bottom surface engaged with a motor cap 515. The motor cap 515 may have defined therein a second through hole 515a through which a motor rotation shaft 520 passes, and a second hole 515b. A second underwater bearing 13 disposed on the motor rotation shaft 520 may be disposed in the second through hole 515a. Through the second hole 515b, cooling water may be introduced from a gear housing 410 to the second region 510b of the motor housing 510.

As is apparent from the above description, the present disclosure provides the following effects.

According to an implementation of the present disclosure, gear portions capable of being used underwater and underwater bearings are adopted in a cooling valve, thereby facilitating cooling of the gear portions and a motor and preventing damage due to friction among the gear portions. In addition, because the gear portions and the underwater bearings are adopted in the cooling valve, the gear portions and the underwater bearings may be lubricated at all times without separate lubricating oil.

According to an implementation of the present disclosure, gear portions capable of being used underwater and underwater bearings are adopted in a cooling valve, thereby allowing a rotor of a motor to be directly cooled by cooling water and allowing heat generated by a controller located adjacent to the rotor to be easily dissipated. Therefore, the performance of cooling the motor may be improved so that a high-power motor may be adopted in the cooling valve, and because a cooling structure needed in cooling the controller may be removed, spatial inefficiency may be eliminated.

In the above, implementations of the present disclosure have been described with reference to the accompanying drawings. However, those skilled in the art to which the present disclosure pertains will understand that the present disclosure may be embodied in other specific forms without changing the technical idea or essential features thereof. Therefore, it should be understood that the implementations described above are illustrative in all respects and not restrictive.

What is claimed is:

1. A valve actuator of a cooling valve, the cooling valve being configured to control cooling water in a thermal management system for cooling a fuel cell, the valve actuator comprising:
   a motor comprising a rotor, a stator, and a motor housing;
   a gear assembly comprising a gear housing, the gear assembly being connected to a valve rotation shaft of a valve plate of the cooling valve, the valve plate being configured to control a passage of cooling water;
   a motor rotation shaft connected to the gear assembly and configured to rotate the rotor,
   a first underwater bearing disposed between the valve rotation shaft and the gear housing; and
   a second underwater bearing disposed between the motor rotation shaft and the gear housing,
   wherein cooling water introduced into the cooling valve is introduced into the motor housing and the gear housing so as to cool the gear assembly and the motor.

2. The valve actuator according to claim 1, wherein the gear housing defines a first hole configured to receive cooling water introduced from a valve portion of the cooling valve into the gear housing, the valve portion comprising the valve plate and the valve rotation shaft.

3. The valve actuator according to claim 2, wherein the gear housing defines therein a second hole configured to receive cooling water introduced into the motor housing from the gear housing.

4. The valve actuator according to claim 1, wherein the motor housing comprises a partition wall disposed between the stator and the rotor and configured to block the cooling water in the motor housing from being introduced to the stator.

5. The valve actuator according to claim 4, further comprising a third underwater bearing disposed at the motor rotation shaft and spaced apart from the second underwater bearing in an extension direction of the motor rotation shaft.

6. The valve actuator according to claim 5, wherein the motor housing defines an insertion portion that receives the motor rotation shaft, and
   wherein the third underwater bearing is disposed between the insertion portion and the motor rotation shaft.

7. The valve actuator according to claim 5, wherein each of the first underwater bearing, the second underwater bearing, and the third underwater bearing is made of any one of polypropylene (PP), polyphthalamide (PPA), polyamide9T (PA9T), polyphenylene sulfide (PPS), polyether ether ketone (PEEK), polyphenylsulfone (PPSU), polyetherimide (PEI), or polysulfone (PSU).

8. The valve actuator according to claim 4, further comprising a controller configured to control the motor and disposed in a space between the partition wall and the motor housing, the partition wall surrounding an axis of the motor rotation shaft.

9. The valve actuator according to claim 1, further comprising:
   a controller configured to control the motor; and
   a controller housing that surrounds the controller, the controller housing being disposed at an outer side of the motor housing in an extension direction of the motor rotation shaft.

10. The valve actuator according to claim 1, wherein the gear assembly comprises:
    a first gear portion connected to the valve rotation shaft;
    a second gear portion connected to the motor rotation shaft; and a third gear portion engaged with the first gear portion and the second gear portion, and wherein the motor rotation shaft defines a hollow configured to receive cooling water.

11. The valve actuator according to claim 1, further comprising a controller configured to control the motor and disposed at a position opposite to the gear housing with respect to the motor.

12. A valve actuator of a cooling valve, the cooling valve being configured to control cooling water in a thermal management system for cooling a fuel cell, the valve actuator comprising:

a motor comprising a rotor, a stator, and a motor housing;

a motor rotation shaft configured to rotate the rotor;

a gear assembly comprising a gear housing, the gear housing being disposed in a valve housing of the cooling valve, the valve housing surrounding a valve plate and a valve rotation shaft configured to control a passage of cooling water, wherein the gear assembly has a first side connected to the valve rotation shaft and a second side connected to the motor rotation shaft;

a first underwater bearing disposed between the valve rotation shaft and the gear housing; and a second underwater bearing disposed between the motor rotation shaft and the motor housing, wherein the motor housing is configured to receive cooling water introduced from the cooling valve into the motor housing and the gear housing for cooling the gear assembly and the motor.

13. The valve actuator according to claim 12, wherein the gear housing defines a first hole configured to receive cooling water from the valve housing into the gear housing wherein cooling water is introduced from the valve housing into the gear housing through the first hole through the first hole.

14. The valve actuator according to claim 12, wherein the motor housing has (i) a first region in which the stator is disposed and sealed and (ii) a second region in which the rotor is disposed, wherein the motor housing comprises:

a partition wall that separates the first region from the second region, and a motor cap engaged with the partition wall, and wherein the valve actuator further comprises a controller disposed in the first region between the partition wall and the motor housing, the partition wall surrounding an axis of the motor rotation shaft.

15. The valve actuator according to claim 14, wherein the motor rotation shaft passes through the motor cap, and wherein the motor cap defines a second hole configured to receive cooling water introduced from the gear housing into the second region in the motor housing.

16. The valve actuator according to claim 15, wherein the second underwater bearing is disposed between the motor cap and the motor rotation shaft.

17. The valve actuator according to claim 14, wherein the motor housing defines a gap configured to receive cooling water, the gap being defined at an outer side of the first region in a radial direction of the motor rotation shaft wherein the gap is an empty space defined in the outer side of the first region in a direction perpendicular to the direction in which the motor rotation shaft extends.

18. The valve actuator according to claim 14, further comprising a third underwater bearing disposed at the motor rotation shaft and spaced apart from the second underwater bearing in an extension direction of the motor rotation shaft, wherein the partition wall defines an insertion portion that receives the motor rotations shaft, and wherein the third underwater bearing is disposed between the insertion portion and the motor rotation shaft.

19. The valve actuator according to claim 12, wherein the gear assembly comprises:

a first gear portion connected to the valve rotation shaft;

a second gear portion connected to the motor rotation shaft; and a third gear portion engaged with the first gear portion and the second gear portion, and wherein the gear housing has an inner surface that defines a toothed portion engaged with the first gear portion.

20. The valve actuator according to claim 19, wherein the first gear portion comprises:

a first carrier connected to the valve rotation shaft; and a plurality of first planetary gears connected to the first carrier, wherein the third gear portion comprises:

a second carrier engaged with the plurality of first planetary gears, and a plurality of second planetary gears connected to the second carrier, and wherein the second gear portion comprises a sun gear engaged with the plurality of second planetary gears.

* * * * *